No. 853,042. PATENTED MAY 7, 1907.
J. THOMSON.
EDUCATIONAL DEVICE.
APPLICATION FILED DEC. 3, 1906.
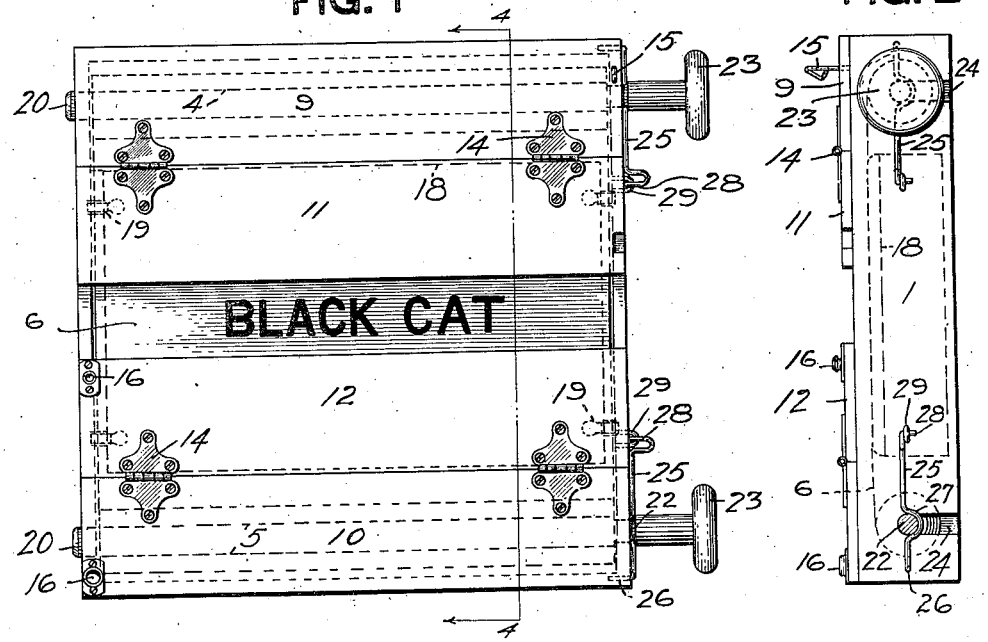
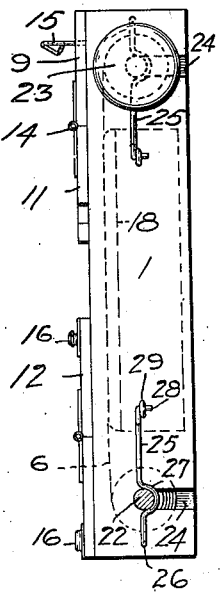
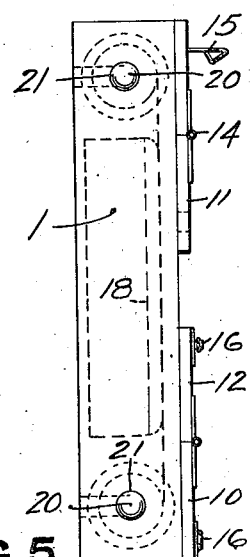
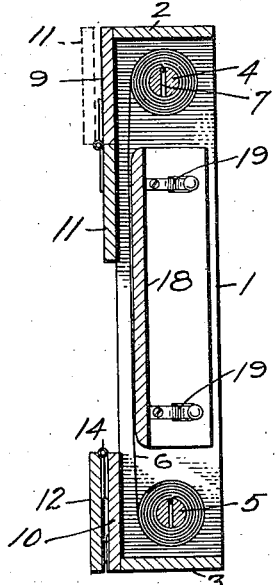
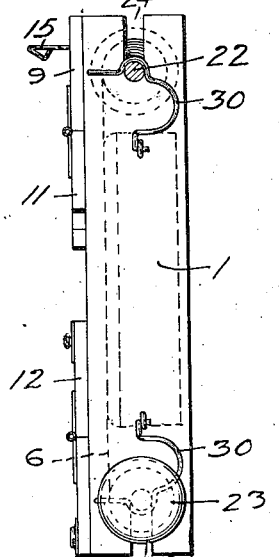
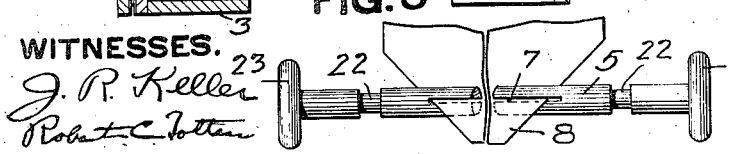
WITNESSES.
J. R. Keller
Robert C. Totten
INVENTOR.
John Thomson
By Kay Totten & Write
attorney

UNITED STATES PATENT OFFICE.

JOHN THOMSON, OF WILKINSBURG, PENNSYLVANIA.

EDUCATIONAL DEVICE.

No. 853,042.  Specification of Letters Patent.  Patented May 7, 1907.

Application filed December 3, 1906. Serial No. 346,033.

*To all whom it may concern:*

Be it known that I, JOHN THOMSON, a resident of Wilkinsburg, in the county of Allegheny and State of Pennsylvania, have invented a new and useful Improvement in Educational Devices; and I do hereby declare the following to be a full, clear, and exact description thereof.

This invention relates to an educational device, and more especially to a device used in teaching subjects wherein chart or blackboard work is ordinarily employed.

The object of the invention is to provide a device or this purpose which is simple of construction, easy to use, whereby various subjects may be taught and whereby the amount of instructing material exposed to view may be varied.

In the accompanying drawing Figure 1 is a front or face view o my device; Fig. 2 is a view of one end thereof; Fig. 3 is a view of the other end; Fig. 4 is a vertical section therethrough on the line 4—4, Fig. 1; Fig. 5 is a detail of the rollers; and Fig. 6 is an end view showing a modification.

My device comprises a suitable frame, preferably rectangular as shown, having side pieces 1, top piece 2, and bottom piece 3. In this frame is mounted a suitable upper roller 4 and lower roller 5 for carrying the tape, sheet or chart 6, these rollers being so arranged that the chart or sheet can be rolled backward and orward from one to the other, as will be readily gathered from Fig. 4, so as to vary the position of the sheet or chart. The ends of the chart or sheet may be attached to the rollers in any suitable way. For this purpose I have shown the roller provided with a slot 7 for receiving an end 8 of the chart or sheet.

On the front of the device, both at top and bottom, I provide the face or covering strips or boards 9 and 10 respectively, which cover and conceal the ollers  The space between these top and bottom boards is intended for exposing the matter printed, written, or drawn upon the chart or sheet. In teaching different subjects or even in teaching the same subject, it is frequently desirable to expose a greater or lesser amount of the subject matter on the chart or sheet. To conveniently do this I provide a movable shutter or shutters two such shutters being shown and numbered 11 and 12 respectively, one at the top and one at the bottom. These shutters are independently movable so that one may be moved or opened to expose more of the chart or sheet while the other is in a closed position, so that either one, or both may be open or closed as indicated in Fig. 4. These shutters may be mounted in various ways so as to be movable. I have shown them connected respectively to the top and bottom face boards 9 and 10 by means of hinges 14 whereon they can be swung to closed or open position, to conceal or expose the chart or sheet. Suitable means are also provided for holding these shutters in both open and closed position, such as the spring catches 15, or ordinary spring snap fastener 16. Various other devices will adapt themselves for this purpose.

In order to enable the chart or sheet to be prepared or altered while in position in the device, I provide a suitable printing table or backing board 18, preferably removably secured to the sides of the frame 1, as by means of catches 19, and lying just behind the exposed portion of the chart or sheet, said backing board serving as a rest or table so that the teacher can write, print or draw upon the chart or sheet while it is in position.

In order to adapt the same device for teaching various subjects the rollers 4 and 5 are so mounted in the frame as to be readily removed with the chart or sheet rolled thereon. This may be accomplished in various ways. In Figs. 1 to 4 the rollers are shown provided with journals 20 at one end projecting into holes 21 in one of the side frames, and at the opposite end with extended journals 22 provided with knobs or hand wheels 23 for rotating the rolls. The journals 22 enter notches 24 cut into the other side frame from one edge and the rollers are held in position by a resilient bearing member consisting of a wire or small rod 25 having one end suitably secured to the frame, as at 26, and being provided with a bent or looped portion 27 for embracing the roll journal and having its opposite end removably secured to the frame, such as providing the same with a hook 28 entering a staple 29 driven into the frame. In order to remove the roller it is only necessary to disengage the hook 28 from the staple 29 when the wire member can be swung out of the way to permit the removal of the roller. The resiliency of this wire enables the same to form a friction bearing for the rollers, or in other words, to act as a friction brake so as to prevent the rollers from rotating idly and unreeling the chart or sheet wound thereon.

Fig. 6 shows a modification wherein notches 24ª are cut into the ends of the frame instead of in from the edge. This enables both ends of the rollers to be provided with knobs or hand wheels. The spring bearing member in this case is shown at 30 as of slightly different shape than in the other views, but acting exactly in the same way.

In the use of the device, a roller with a chart or sheet wound thereon is inserted in one end of the frame and the end of the chart or sheet drawn over the backing board 18, (or the backing board can be removed if desired) and attached to the other roller, when, by rotating the latter, the chart or sheet can be wound upon the latter roller and unwound from the first roller. The chart or sheet can be moved backwardly or forwardly as often or to as great an extent as desired. When it is desired to change the subject, the chart or sheet will be rolled onto one of the rollers and this roller removed and replaced by a similar roller having thereon a chart or sheet containing different subject matter. If it is desired or necessary to expose only a small portion of the chart or sheet, both of the shutters 11 and 12 will be held in closed position, thus exposing only, say a line of reading matter. If more than a single line is intended to be exposed, one of the shutters can be opened and if still more is to be exposed, the other shutter also can be opened. Should the teacher desire to alter or add to the matter on the sheet or chart, this can be readily done while in place in the device, as the backing board 18 acts as a table.

The device described is capable of being used in teaching many subjects. It is easy to handle and very greatly reduces the labor of the teacher when following certain methods required at the present time and in which it is necessary to practically put all of the work, especially sight work, upon a blackboard. In the foregoing specification, no attempt has been made to describe the various subjects or the various uses to which the device can be applied.

What I claim is:

1. An educational device comprising a frame, chart or sheet carrying rollers mounted in said frame, and spring members secured to the frame and having looped portions forming bearings for the roller journals.

2. An educational device comprising a frame, chart or sheet carrying rollers mounted in said frame, and spring members movably secured to the frame and having looped portions forming bearings and brakes for the roller journals.

3. An educational device comprising a frame provided with slots, chart or sheet carrying rollers having journals located in said slots, and spring members pivoted to the frame and each provided with a bend bearing against a roll journal and provided with means at the end for securing to the frame.

4. An educational device comprising a frame, chart or sheet carrying rollers mounted in said frame, a printing table in the frame back of the chart or sheet, and catches detachably securing said printing table to said frame.

5. An educational device comprising a frame open at its rear, chart or sheet carrying rollers mounted in said frame, and a printing table detachably secured to the frame and removable through the open back of the frame.

6. An educational device comprising a frame, chart or sheet carrying rollers mounted in said frame, and a shutter or shutters hinged to the frame on pivots parallel to the axes of the rollers and permitting the exposure of a greater or lesser portion of the chart or sheet.

7. An educational device comprising a frame, chart or sheet carrying rollers mounted in said frame, a shutter or shutters hinged on the frame on pivots parallel to the axes of the rollers and permitting the exposure of a greater or lesser portion of the chart or sheet, and means for securing said shutters in both closed and open positions.

8. An educational device comprising a frame, chart or sheet carrying rollers removably mounted in said frame, a movable shutter or shutters on the frame parallel to the axes of the rollers and permitting the exposure of a greater or lesser portion of the chart or sheet, and a printing table in the frame back of the portion of the chart or sheet which is exposed by said shutters.

9. An educational device comprising a frame, chart or sheet carrying rollers mounted in said frame, spring members movably secured to the frame and having looped portions forming bearings for the journals of said rollers, and a movable shutter or shutters on the frame permitting the exposure of a greater or lesser portion of the chart or sheet.

In testimony whereof, I the said JOHN THOMSON have hereunto set my hand.

JOHN THOMSON.

Witnesses:
G. H. RANKIN,
F. W. WINTER.